United States Patent [19]

Owens

[11] Patent Number: 5,744,877
[45] Date of Patent: Apr. 28, 1998

[54] DOWNHOLE POWER TRANSMISSION SYSTEM

[75] Inventor: Steve Owens, Woodlands, Tex.

[73] Assignee: PES, Inc., Woodlands, Tex.

[21] Appl. No.: 782,326

[22] Filed: Jan. 13, 1997

[51] Int. Cl.$^6$ ..................................................... G01V 3/04
[52] U.S. Cl. ..................... 307/103; 323/909; 340/870.39
[58] Field of Search ................................... 307/103, 126, 307/130; 323/284, 909, 285; 340/855.7, 855.8, 870.16, 870.26, 870.39

[56] References Cited

U.S. PATENT DOCUMENTS 4,568,933  2/1986  McCracken et al. ................... 340/856
5,483,232  1/1996  Clark, Jr. et al. ..................... 340/853.1

*Primary Examiner*—Edward Tso
*Assistant Examiner*—Shawn Riley

[57] ABSTRACT

A system for providing large quantities of power at a selected voltage to a downhole well tool. A conductor extends between a surface regulator and the well tool. The voltage is continuously measured downhole at the well tool, and a signal proportional to such downhole voltage is transmitted to the surface regulator. The power transmitted by the surface regulator to the conductor is increased or decreased depending on fluctuations in the tool requirements and the downhole voltage. The downhole voltage signal can be modulated through the conductor to the surface regulator or can be transmitted through another conductor.

18 Claims, 1 Drawing Sheet

DOWNHOLE POWER TRANSMISSION SYSTEM

BACKGROUND OF THE INVENTION

The present invention relates to electric power transmission to downhole tools requiring relatively large quantities of power. More particularly, the invention comprises an electrical power transmission system for supplying large quantities of power at a regulated voltage to tools downhole in a wellbore.

Numerous downhole tools require electrical power. Certain tools use a wireline to provide structural support for the tool and to provide an electrical conductor for electrical power transmission. Downhole tools which require electrical power can measure well conditions, transport well components within the wellbore, move sliding sleeves, pump fluids, and perform other functions.

Electric power is typically supplied to downhole tools by applying a fixed voltage to the surface end of a wireline or similar conductor. The voltage applied to the wireline is higher than the required operating voltage because internal conductor resistance results in power transmission losses. The power consumed by a conductor such as a wireline is proportional to the electric current squared and multiplied by the wireline resistance, or by the voltage drop in the wireline squared and divided by the wireline resistance. Accordingly, high voltage power transmission is preferred over high current power transmission because less power is dissipated through resistance losses.

The maximum voltage that can be applied to a wireline is typically limited by the dielectric strength of the material insulating the wireline. Furthermore, the Maximum Power Transfer Theorem for electrical power delivery systems states that the maximum power that can be supplied to a load occurs when the impedance of the source equals the load impedance. Accordingly, the maximum power that can be transmitted to a downhole tool is equal to one half of maximum withstanding voltage squared divided by the wireline impedance.

When voltage transmitted through a conductor such as a wireline exceeds the required tool voltage, the transmitted voltage must be "stepped down" with a voltage regulator or similar device. Although low power voltage regulators are relatively simple and easy to install, higher power requirements require sophisticated voltage regulator design. Conventional high voltage regulators may not fit within the confines of a wellbore and can interfere with other downhole well equipment.

In addition to the space limitations downhole in a wellbore, conventional regulators are not adaptable to varying electrical load requirements. In many downhole tools such as electric submersible pumps, the required voltage fluctuates as a function of time, conductor length, temperature and tool load demands. Consequently, a high power voltage regulator system must be able to withstand wide voltage variations in order to compensate for wireline resistance losses, and must survive input voltages often exceeding 2000V. Additionally, such downhole voltage regulator must survive downhole well environments having high temperatures and pressures, vibrational forces, and limited space within the wellbore.

Different power transmission systems have been proposed to address the problems associated with downhole power transmission. One technique known as the "power trim" method measures the resistance of the wireline before the wireline is run into the wellbore. The surface power is set at a value that will account for the line voltage drop calculated from the wireline length and resistance. Although this method approximates the downhole conditions and wireline resistance losses, such method assumes that the load current demand is constant and is not effective when the load current demand changes.

Another technique was disclosed in U.S. Pat. No. 5,483,232, wherein the alternating current ("AC") waveform at the wellbore surface was measured. An approximation of the downhole tool voltage was calculated through signal processing and by measuring the cable resistance. However, this method is applicable to AC power instead of DC power and does not compensate for loads having variable power demands.

A need, therefore, exists for an improved electrical power transmission system for supplying high quantities of electrical power to a downhole tool at a regulated voltage. The power supply system should overcome the limitations present in existing voltage regulator and power supply systems.

SUMMARY OF THE INVENTION

The present invention furnishes an improved system for transmitting large quantities of electric power between a power source and a downhole tool. The invention comprises a regulator for engagement with the power source and for modifying the power transmitted through the regulator, a conductor for transmitting electric power from the regulator to the downhole tool, and a transmitter for detecting the downhole conductor voltage proximate to the downhole tool and for transmitting to the regulator a voltage signal representative of the downhole conductor voltage. The regulator is responsive to the voltage signal and modifies the power transmitted into said conductor.

In one embodiment of the invention, the voltage signal can comprise a frequency proportional to the downhole conductor voltage which is modulated through the conductor to the regulator.

The method of the invention is practiced by transmitting electric power from the power source through a regulator to a conductor engaged with the downhole tool, by generating a voltage signal representing the downhole conductor voltage proximate to the downhole tool, by transmitting the voltage signal to the regulator, and by operating the regulator in response to the voltage signal to modify the electric power transmitted from the power source to the conductor.

DESCRIPTION OF THE PREFERRED EMBODIMENTS

The present invention provides an improved power transmission system for supplying large quantities of power downhole to a well tool at a regulated voltage.

Figure 1:
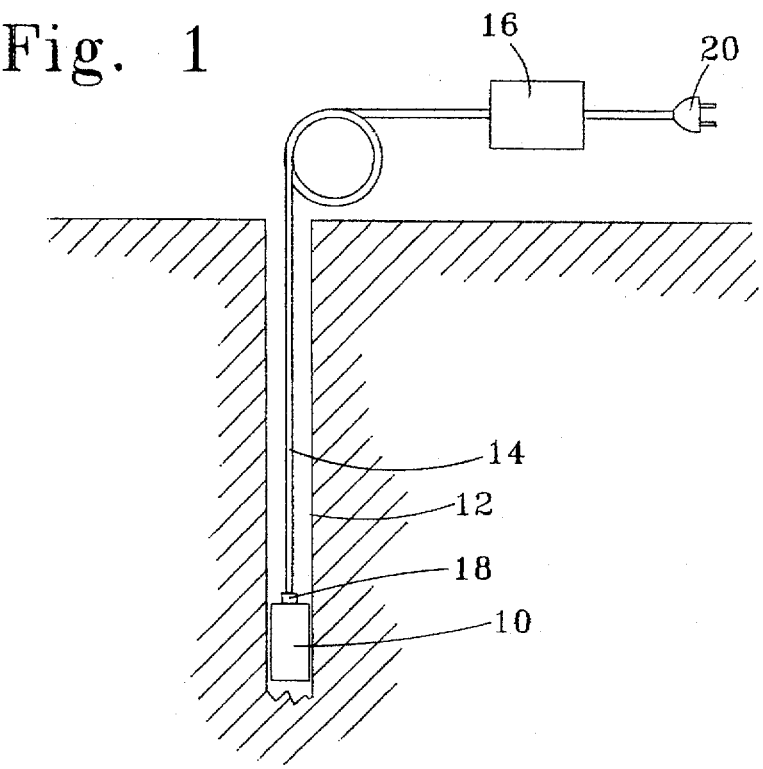
FIG. 1 illustrates an electrical block diagram for one embodiment of the invention.

Referring to FIG. 1, the invention is engaged with an electrical load illustrated as downhole well tool 10. Tool 10 is typically positioned downhole in a vertical, deviated or horizontal wellbore 12 thousands of meters from the surface or wellbore 12. Power transmission conductor 14 typically extends downwardly from wellbore 12 surface to tool 10 as shown in FIG. 1, and is connected at the wellbore 12 surface to regulator 16. Connector 18 provides engagement between the lower end of conductor 14 and tool 10.

Regulator 16 is engaged with power source 20 which provides direct current ("DC") in a preferred embodiment of the invention. Although power source 20 is typically located at the surface of wellbore 12 in a preferred embodiment of the invention, power source 20 could be located at any elevation downhole in wellbore 12. In another embodiment of the invention, AC power can be provided by power source and can be converted to DC power as described below.

Conductor 14 can comprise a wireline in a preferred embodiment of the invention. Conductor 14 can comprise other devices such as single or multi-strand cables, tubing, or other elements capable of transmitting electrical power. Although conductor 14 typically extends from the surface of wellbore 12 to well tool 10 downhole in wellbore 12, the invention is also applicable to a conductor 12 which extends between different positions downhole in wellbore 12. In one embodiment of the invention, tool 10 can comprise a load distribution source for distributing electrical power to at least two electrical load devices.

Regulator 16 differs from conventional regulators because regulator 16 can change the voltage provided to conductor 14. Specifically, regulator 16 changes the voltage applied to conductor 14 in response to a measured downhole voltage as described below. Although regulator 16 is illustrated as being positioned at the well surface to permit convenient access, regulator 16 can be positioned at any position within wellbore 12 or at a distance from the surface of wellbore 12. For example, regulator 16 could be located downhole in single wellbore and one or more conductors 14 could be run into one or more lateral wellbore branches.

Figure 2:
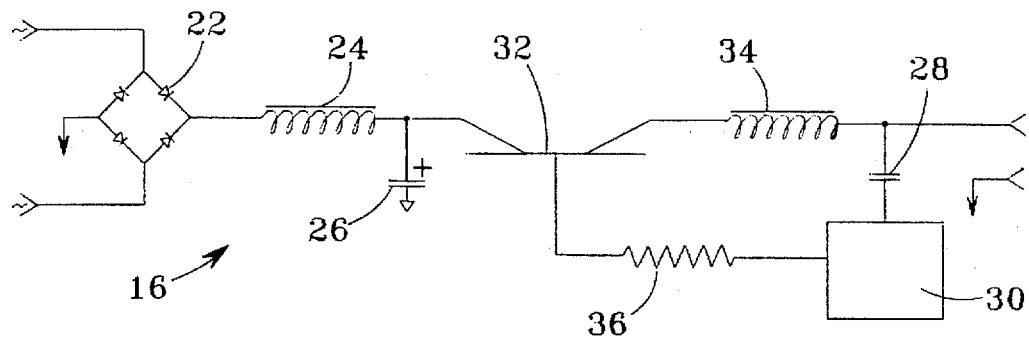
FIG. 2 illustrates a schematic for a surface voltage regulator.

FIG. 2 illustrates a schematic of surface regulator 16 wherein AC power is supplied to rectifier 22 and is then filtered with filter choke 24 and filter capacitor 26 to produce a DC voltage. The signal for tool 10 is coupled through capacitor 28 and applied to frequency to voltage converter 30. Converter 30 is designed to produce a voltage which when applied to transistor 32 will regulate the voltage at a fixed, predetermined voltage at connector 18 between tool 10 and conductor 14. Blocking choke 34 is positioned between transistor 32 and converter 30, and resistor 36 is positioned between converter 30 and transistor 32.

Figure 3:
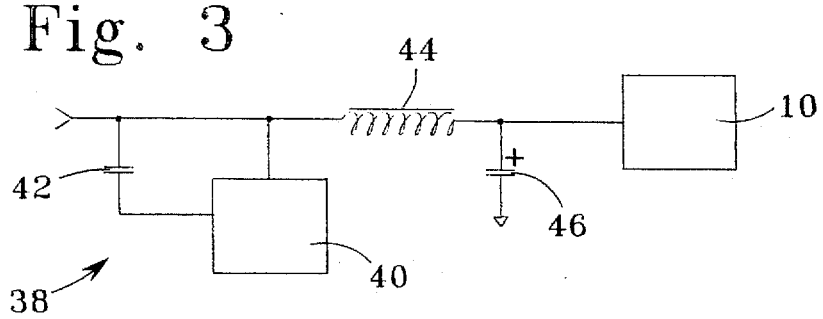
FIG. 3 illustrates a schematic of a downhole transmitter circuit for detecting the downhole voltage and for generating a voltage signal representative of the downhole voltage.

FIG. 3 illustrates a schematic of a downhole transmitter circuit 38. The voltage at connector 18 between conductor 14 and tool 10 is applied to voltage to frequency converter 40. The frequency from converter 40, which is proportional to the voltage at connector 18 between conductor 14 and tool 10, is coupled onto conductor 14 through coupling capacitor 42. Blocking choke 44 and filter capacitor 46 are placed between converter 40 and tool 10. In this manner, the voltage of conductor 14 proximate to tool 10 is detected, and a signal representing such voltage ("voltage signal") is transmitted to regulator 16. Although the voltage signal can be generated in this manner, the voltage signal can be generated in other ways and forms. To accomplish the function of the invention, the voltage signal does not have to equal the actual conductor voltage proximate to tool 10, but instead indicates changes and the magnitude of changes in the actual conductor voltage.

This embodiment of the invention is applicable to power transmission systems having a single conductor. In another embodiment, the invention also operates with multi-conductor lines such as multiple strand wirelines. In such embodiment, the voltage at connector 18 can be transmitted to surface regulator 16 through any other conductor in the multi-conductor wireline. This embodiment of the invention eliminates the need to convert the voltage to a frequency signal at connector 18.

To use the invention between a power source 20 and a downhole tool, electric power is transmitted from power source 20 through regulator 16 to conductor 14 engaged with the downhole tool 10. Downhole voltage signal representing the conductor 14 voltage proximate to tool 10 is generated, and the voltage signal is transmitted to regulator 16. Regulator 16 is operated in response to the voltage signal to modify the electric power transmitted from power source 20 to conductor 14.

In different embodiments of the invention, the voltage signal can be transmitted to regulator 16 through conductor 14 or through another conductor. The voltage signal can be generated by modulating a frequency signal proportional to the conductor voltage proximate to downhole tool 10 as described above or can be generated using other techniques known in the art.

As a representative example of the invention, a downhole well tool such as tool 10 may require an ideal operating voltage of 500V at the location where connector 18 attaches conductor 14 and tool 10. Voltage to frequency converter 40 can be configured to produce a frequency of 500 Hz (the voltage signal) when the voltage at connector 18 equals 500V, and the 500 Hz frequency can be modulated through conductor 14 to be received by frequency to voltage converter 30. If converter 30 receives a frequency less than 500 Hz, regulator 16 increases the voltage provided to conductor 14. If converter 30 receives a frequency greater than 500 Hz, regulator 16 decreases the voltage provided to conductor 14. Because the invention provides this adjustment continuously, the voltage at tool 10 is essentially held constant without requiring a regulating circuit in downhole well tool 10.

The invention reduces the number of components located downhole in the wellbore which may be subject to extreme temperatures, pressures, and impact forces. The invention can be attached to conventional wirelines without requiring additional conductors in the wellbore, and provides continuous real-time control over the actual voltage supplied to a downhole well tool. Variations in the downhole voltage are automatically compensated, and the estimation errors associated with conventional power transmission systems is substantially eliminated.

Although the invention is suitable for well tools having relatively low power requirements, the invention is particularly advantageous for well tools which have variable power loads or large power requirements. As one representative example, the invention is particularly adaptable to tractors in deviated and horizontal wells for pulling tubing or other well components through the wellbores. Such motors require up to 2000V and drive hydraulic pumps for performing various physical operations. The invention is also suitable for logging tools, electric submersible pumps, smart shifting devices, and other downhole tools.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A system for transmitting electric power between a power source and a downhole tool, comprising:

a regulator for engagement with the power source and for modifying the power transmitted through said regulator;

a conductor for transmitting electric power from said regulator to the downhole tool; and a transmitter for detecting the downhole conductor voltage proximate to the downhole tool and for transmitting to said regulator a voltage signal representative of said downhole conductor voltage, wherein said regulator is responsive to said voltage signal for modifying the power transmitted from the power source into said conductor to maintain said downhole conductor voltage at a selected level.

2. A system as recited in claim 1, wherein said regulator is capable of maintaining said downhole conductor voltage at substantially the same voltage when the downhole tool power requirements change.

3. A system as recited in claim 1, further comprising a second conductor for transmitting said voltage signal from said transmitter to said regulator.

4. A system as recited in claim 1, wherein said voltage signal is generated by operating said transmitter to modulate a frequency proportional to said downhole conductor voltage.

5. A system as recited in claim 4, wherein said voltage signal is transmitted through said conductor to said regulator.

6. A system as recited in claim 1, wherein said power source is located downhole in a wellbore.

7. A system as recited in claim 1, wherein the downhole tool comprises a load distribution source for distributing electrical power to at least two load devices.

8. A system for transmitting electric power between a power source and a downhole tool, comprising:

a regulator for engagement with the power source and for modifying the power transmitted through said regulator;

a conductor for transmitting electric power from said regulator to the downhole tool; and a transmitter for generating a frequency proportional to the downhole conductor voltage proximate to the downhole tool and for transmitting said frequency to said regulator, wherein said regulator is responsive to said frequency for modifying the power transmitted from the power source into said conductor to maintain said downhole conductor voltage at a selected level.

9. A system as recited in claim 8, wherein said regulator is capable of increasing the power transmitted to said conductor when said frequency decreases below a selected amount.

10. A system as recited in claim 8, wherein said regulator is capable of decreasing the power transmitted to said conductor when said frequency increases above a selected amount.

11. A system as recited in claim 8, wherein said frequency is transmitted to said regulator through said conductor.

12. A system as recited in claim 8, further comprising a second conductor for transmitting said frequency to said conductor.

13. A method for transmitting electric power between a power source and a downhole tool, comprising the steps of:

transmitting electric power from the power source through a regulator to a conductor engaged with the downhole tool;

generating a voltage signal representing the downhole conductor voltage proximate to the downhole tool;

transmitting the voltage signal to said regulator; and operating said regulator in response to said voltage signal to modify the electric power transmitted from the power source to said conductor to maintain said downhole conductor voltage at a selected level.

14. A method as recited in claim 13, wherein said voltage signal is generated by modulating a frequency signal proportional to the downhole conductor voltage.

15. A method as recited in claim 14, wherein said voltage signal is transmitted to said regulator through said conductor.

16. A method as recited in claim 13, wherein said voltage signal is transmitted to said regulator through a second conductor.

17. A method as recited in claim 13, further comprising the step of operating said regulator, in response to a decrease in value of said voltage signal, to increase the power transmitted to said conductor.

18. A method as recited in claim 13, further comprising the step of operating said regulator, in response to an increase in value of said voltage signal, to decrease the power transmitted to said conductor.

* * * * *